UNITED STATES PATENT OFFICE.

EMILE MAERTENS, OF PROVIDENCE, RHODE ISLAND.

PROCESS OF CLEANING WOOL.

SPECIFICATION forming part of Letters Patent No. 698,210, dated April 22, 1902.

Application filed March 7, 1901. Serial No. 50,190. (No specimens.)

*To all whom it may concern:*

Be it known that I, EMILE MAERTENS, a citizen of the United States, residing at Providence, in the county of Providence and State of Rhode Island, have invented new and useful Improvements in the Art of Cleaning Wool with Volatile Solvents, of which the following is a specification.

This invention relates more specifically to the preliminary treatment of wool or other animal fibers in the process of degreasing the same with a volatile fat-solvent (such as naphtha) for the purpose of preventing or correcting the emulsification of the volatile fat-solvent used in the degreasing operation while the wool (or other animal fiber) is being freed from the volatile fat-solvent or from its residue by means of water or aqueous solutions prior to its removal from the digester or when the wool is being extracted in a moist or wet condition.

The application of the present process relates more particularly to wools (or other animal fibers) which contain natural soaps or potash compounds, and is intended to either remove these soaps or potash compounds present on the fiber or to decompose or change them, (by such agents as shall not cause the precipitation upon the fiber of insoluble soaps or of substances insoluble in either a volatile fat-solvent, water, or soapy and alkaline solutions,) and thus prevent or correct the emulsification of the volatile fat-solvent therewith and with the water present or used for its removal from the fiber.

The operation is carried on in apparatus such as described in United States Patents Nos. 630,293, 630,294, 630,295, 630,296, 654,529, 654,530, 660,757, and 660,758, the essential difference between the processes described therein and the present process consisting in the removal, decomposition, or transformation of the potash salts present in the wool (or other animal fibers) before its extraction with a volatile fat-solvent and the extraction of said wool (or other animal fibers) in a damp or wet state instead of in a dry state, as heretofore practiced.

When the potash salts or natural soaps are to be removed as such from the wool (or other animal fibers) before its extraction, water or solutions of potash salts or solutions of potash salts and water or other aqueous solutions are used for the purpose; but when the soaps are to be transformed or decomposed on the fiber a solution of any chemical agent which will decompose or transform the natural soaps without forming on the fiber a compound insoluble in either a volatile fat-solvent, in water, or in alkaline and soapy solutions is available for the purpose mentioned, and among the most suitable chlorid of sodium, sulfate of sodium, oxalic acid, sulfuric acid, and muriatic acid may be mentioned. The salts named can be used separately or together or with one of the acids mentioned, and vice versa. For economy and convenience I prefer to use aqueous solutions of chlorid of sodium, or of sulfuric acid or of sulfuric acid and chlorid of sodium together and of sufficient strength or concentration to accomplish the transformation or decomposition of the soap present and which will vary according to the nature and condition of the material under treatment.

The preliminary treatment of the wool (or other animal fibers) for the elimination, transformation, or decomposition of the natural soaps present can be carried on in the open and outside of the extracting-digester or in the extracting-digester itself.

When the natural soaps are to be removed from the wool (or other animal fibers) as such, it is treated with water or preferably with unsaturated aqueous solutions of potash soaps, squeezed and rinsed with water until practically freed from potash compounds and then again squeezed for the expression of the bulk of the adhering liquid. In order to insure complete elimination of potash soaps, I prefer to follow the rinsing of the wool with water by a rinsing with an aqueous solution of the salts or acids mentioned, or if the aqueous solution of potash soaps used for the removal of the natural soaps from the wool was comparatively weak the rinsing with water is dispensed with and replaced by a rinsing with a saline or acid solution.

When it is not sought to save the natural soaps from the wool or to remove them as such, the wool is at once treated with an aqueous saline or acid solution or with both together until the soaps present have been transformed or decomposed, when it is compressed for the removal of the bulk of the residual treating solution. The wool (or other animal fibers) having received one of the preliminary treatments described above (for the prevention of the emulsification of the solvent) is now extracted in the digester in the usual manner, and after the expression of the bulk of the residual solvent the remaining residual solvent is removed in any suitable manner, but preferably by water or by an aqueous solution of one of the salts named or by an aqueous solution of one of the acids named, (if the preliminary treatment was of an acid nature,) after which the wool is again compressed for the removal of the bulk of the residual-solvent-removing solution, when it is freed from the last traces of solvent and then rinsed or neutralized and rinsed before its removal from the digester, or these last treatments may follow in the open and after the wool (or other animal fiber) has been removed from the digester.

Having described my invention, what I claim is—

1. In the art of cleaning wool the process which consists in subjecting the wool to the action of an agent to remove the potash soaps, then freeing the wool from the bulk of the adhering liquid, then rinsing the wool with water, then freeing the wool from the bulk of the adhering water, then extracting the fat from the wool by a volatile solvent and then removing the solvent from the wool.

2. In the art of cleaning wool the process which consists in subjecting the wool to the action of an agent to remove the potash soaps, then freeing the wool from the bulk of the adhering liquid, then treating the wool with a suitable acid, saline, or acid saline solution, then freeing the wool from the bulk of the adhering liquid, then treating the wool without previous drying with a volatile solvent to remove the fat therefrom and then removing the solvent from the wool.

3. In the art of cleaning wool containing potash compounds, the process which consists in subjecting the wool to the action of an agent which will decompose or transform the potash soaps present, then removing the bulk of the adhering liquid from the wool, then extracting the fat from the wool without previous drying by a volatile solvent and then removing the solvent from the wool.

4. In the art of cleaning wool the process which consists in treating the wool with a solution of an agent which will deposit the fatty acids of the potash soaps on the fiber, then removing the bulk of the adhering liquid, then extracting the fat with a volatile solvent and then removing the solvent from the wool.

5. In the art of cleaning wool the process which consists in treating the wool with a solution of a suitable salt or acid or of both together, then removing the bulk of the adhering liquid, then subjecting the wool to the action of a volatile solvent and then removing the solvent from the wool.

In testimony whereof I affix my signature in presence of two witnesses.

EMILE MAERTENS.

Witnesses:
RUFUS S. MATTESON,
MABEL I. FAY.